(No Model.)
I. B. BEEKLY.
HAY KNIFE.
No. 567,373. Patented Sept. 8, 1896.
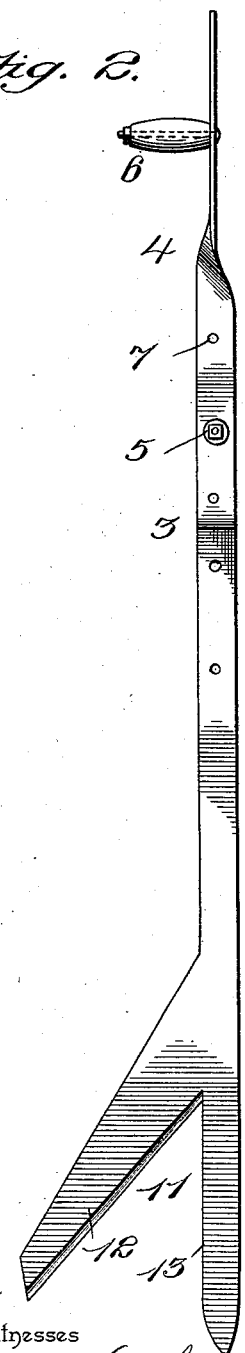
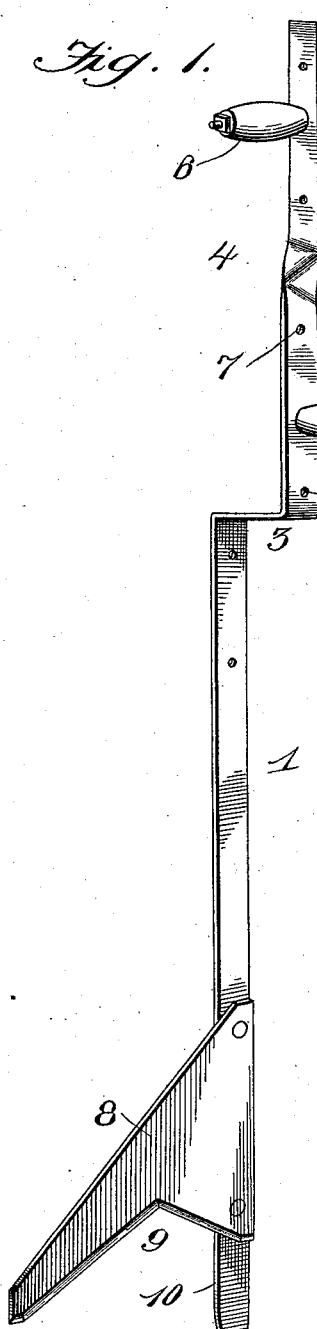
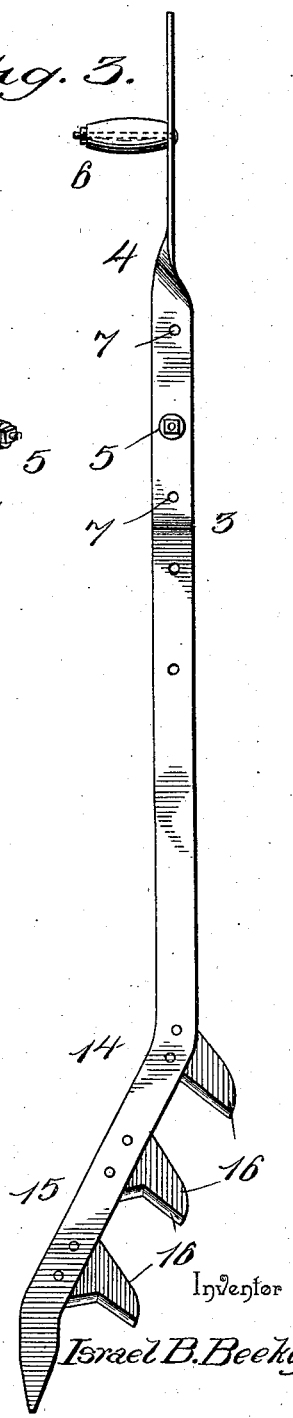

UNITED STATES PATENT OFFICE.

ISRAEL B. BEEKLY, OF GREENVILLE, OHIO.

HAY-KNIFE.

SPECIFICATION forming part of Letters Patent No. 567,373, dated September 8, 1896.

Application filed December 31, 1895. Serial No. 573,958. (No model.)

*To all whom it may concern:*

Be it known that I, ISRAEL B. BEEKLY, a citizen of the United States, residing at Greenville, in the county of Darke and State of Ohio, have invented a new and useful Hay-Knife, of which the following is a specification.

This invention relates to hay-knives and aims to lessen the labor and effort usually required to successfully operate hay-knives as generally constructed, to obviate the effort of side pressure, to avoid skipping, to insure a proper and rapid cut when pressing the knife into the hay, and, lastly, to insure the hay being cut the full capacity of the blade each time the knife is forced into the hay, due to to the automatic feed of the knife.

Other objects and advantages are contemplated and will become apparent as the nature of the invention is better understood, and to this and such other ends as appertain to the invention and to a full knowledge of the same reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a perspective view of a hay-knife of the preferred construction. Figs. 2 and 3 represent different forms.

The stem or pole 1 is preferably formed from a bar of iron about a quarter of an inch thick and an inch and a quarter wide, having its lower end drawn to provide a penetrating point 2, and having an offset 3 about midway of its ends, so as to throw the upper portion to one side of a straight line passing through the lower portion of the stem, and said upper portion having a quarter-twist 4 midway of its ends to cause the upper part to stand at right angles to a plane passing through the stem in the direction of its width. A handle 5 is adjustably connected with the stem 1 below the twist 4, and a corresponding handle 6 is adjustably connected with the stem or pole above the twist 4, said handles being mounted upon bolts which are fitted to any one of a series of openings 7 in the stem 1, and by means of which the handles can be adjusted to the proper elevation.

A blade 8 is secured to the lower portion of the stem 1 a short distance above the penetrating point 2 and projects from one side thereof and is formed in its lower edge with an approximately inverted-V notch 9, the edges of which are sharpened so as to cut through the hay when pressing the knife therein.

That portion of the stem below the blade 8 and indicated by the numeral 10 forms a guard and penetrates the hay and prevents any side draft when pressing the knife therein. The edge of the lower portion or guard 10, adjacent to the blade 8, is not sharpened, but is cut square across the full thickness of the bar. Hence when pressing the knife into the hay the inclined cutting edge of the blade 8 will not effect a sidewise movement of the stem, which would be the case if the inner edge of the part 10 were sharpened.

In Fig. 2 the stem 11 is pointed at its lower end and the blade 12 has its lower edge straight and extending obliquely from the stem or pole, and the guard 13 is formed in a similar manner to the guard 10 and operates in precisely the same manner.

In Fig. 3 the stem or pole 14 has its lower end portion 15 deflected on an oblique line and provided with a series of blades 16, formed of one piece of sheet-steel and attached to the oblique portion 15 or made separate and having independent connection therewith. That portion of the part 15 between the blades 16 constitutes in effect a guard similar to the parts 10 and 13 and prevents sidewise movement of the knife when forcing it into the hay.

The upper portion of the stem or pole of the forms illustrated in Figs. 2 and 3 will be constructed in a similar manner to Fig. 1 and will be supplied with adjustable handles 5 and 6 to adapt the knife to the user and the nature of the work.

Having thus described the invention, what is claimed as new is—

1. A hay-knife constructed substantially as shown and comprising a pole or stem having a penetrating point, a blade secured to the pole a distance from the point and inclining away from the pole and toward the point, and having a V-notch in its lower edge, forming oppositely-disposed cutters, and having the portion of the pole between the blade and the point constructed to provide a guard, substantially as and for the purpose set forth.

2. A hay-knife constructed substantially as herein set forth, comprising a stem or pole formed of a flattened metal bar having its lower end pointed and constructed to form a guard, and having an offset about midway of its ends and a quarter-twist in the portion above the said offset, handles adjustably fitted to the upper portion of the stem upon opposite sides of the said twist, and a blade secured to the stem above the said guard and having an inclined cutting edge, substantially as specified.

3. A hay-knife comprising a stem or pole having its lower portion deflected on an oblique line and terminating in a penetrating point, and a series of blades arranged at intervals in the length of the said obliquely-deflected portion, substantially as shown and described.

In testimony that I claim the foregoing as my own I have hereto affixed my signature in the presence of two witnesses.

ISRAEL B. BEEKLY.

Witnesses:
   WM. SCHUANS,
   H. M. COLE.